United States Patent
Lin et al.

(10) Patent No.: US 10,240,573 B2
(45) Date of Patent: Mar. 26, 2019

(54) SYSTEM AND METHOD FOR ESTIMATING WHEN A PREDETERMINED PERCENTAGE OF FUEL IS BURNED IN A CYLINDER DURING AN ENGINE CYCLE USING PRINCIPAL COMPONENT ANALYSIS AND FOR CONTROLLING SPARK TIMING OF THE CYLINDER BASED ON THE PREDETERMINED PERCENTAGE

(71) Applicant: GM Global Technology Operations LLC, Detroit, MI (US)

(72) Inventors: Hejie Lin, Troy, MI (US); Jun-Mo Kang, Ann Arbor, MI (US); Jeffrey A. Morgan, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/252,322

(22) Filed: Aug. 31, 2016

(65) Prior Publication Data

US 2018/0058415 A1    Mar. 1, 2018

(51) Int. Cl.
*F02P 5/153* (2006.01)
*F02D 35/02* (2006.01)
(Continued)

(52) U.S. Cl.
CPC ............. *F02P 5/153* (2013.01); *F02D 17/02* (2013.01); *F02D 35/023* (2013.01);
(Continued)

(58) Field of Classification Search
CPC .......... F02P 5/153; F02P 5/045; F02P 5/1518; F02D 41/0002; F02D 41/1444;
(Continued)

(56) References Cited

U.S. PATENT DOCUMENTS

| 5,740,780 A | 4/1998 | Shimizu et al. |
| 7,073,485 B2 | 7/2006 | Truscott et al. |

(Continued)

FOREIGN PATENT DOCUMENTS

| CN | 100501143 C | 6/2009 |
| CN | 102066728 A | 5/2011 |

(Continued)

OTHER PUBLICATIONS

First Office Action for Chinese Patent Application No. 201710751213.1 dated Aug. 27, 2018; 9 pages.

*Primary Examiner* — Lindsay M Low
*Assistant Examiner* — Joshua Campbell

(57) ABSTRACT

A system according to the present disclosure includes a first crank angle module, a second crank angle module, and a spark control module. The first crank angle module determines a first crank angle of an engine at which a predetermined percentage of fuel in a first cylinder of the engine is combusted based on pressure in the first cylinder. The second crank angle module determines a relationship between the first crank angle and a second crank angle of the engine at which the predetermined percentage of fuel in a second cylinder of the engine is combusted based on pressure in the first cylinder and pressure in the second cylinder. The spark control module adjusts spark timing of the first cylinder based on the first crank angle, and adjusts spark timing of the second cylinder based on the relationship between the first and second crank angles.

26 Claims, 8 Drawing Sheets

(51) Int. Cl.
   *F02D 17/02* (2006.01)
   *F02D 41/00* (2006.01)
(52) U.S. Cl.
   CPC ......... *F02D 35/028* (2013.01); *F02D 41/009* (2013.01); *F02D 41/0085* (2013.01); F02D 41/0002 (2013.01); F02D 2041/001 (2013.01); F02D 2200/024 (2013.01); Y02T 10/46 (2013.01)
(58) Field of Classification Search
   CPC .... F02D 17/02; F02D 35/023; F02D 2700/05; F02D 2200/024
   USPC .............................................. 123/435, 406.22
   See application file for complete search history.

(56) References Cited

U.S. PATENT DOCUMENTS

| | | | |
|---|---|---|---|
| 7,779,679 B2* | 8/2010 | Wang | F02D 35/023 73/114.52 |
| 8,291,751 B2 | 10/2012 | Wang et al. | |
| 2005/0039721 A1* | 2/2005 | Truscott | F02D 35/023 123/406.22 |
| 2007/0089697 A1* | 4/2007 | Hara | F02D 35/023 123/90.15 |
| 2011/0118953 A1* | 5/2011 | Duval | F02D 35/023 701/102 |
| 2012/0118267 A1* | 5/2012 | Kang | F02D 13/0207 123/406.26 |
| 2014/0053811 A1* | 2/2014 | De Ojeda | F02D 41/00 123/435 |
| 2015/0337790 A1 | 11/2015 | Schuele et al. | |
| 2016/0290307 A1 | 10/2016 | Urano et al. | |

FOREIGN PATENT DOCUMENTS

| | | |
|---|---|---|
| CN | 104781523 A | 7/2015 |
| CN | 105874190 A | 8/2016 |
| JP | H09209814 A | 8/1997 |

\* cited by examiner

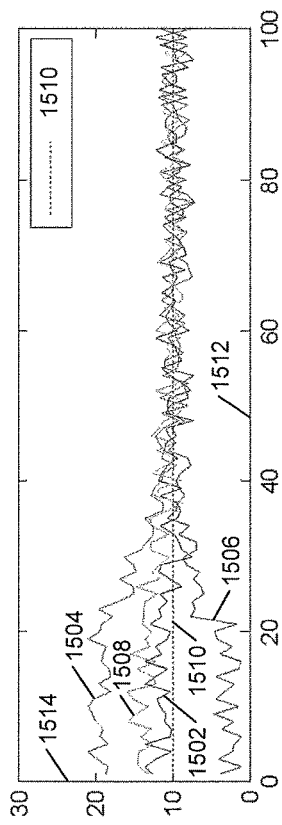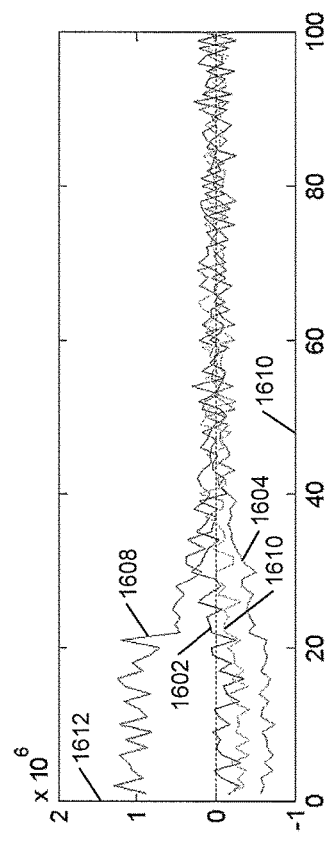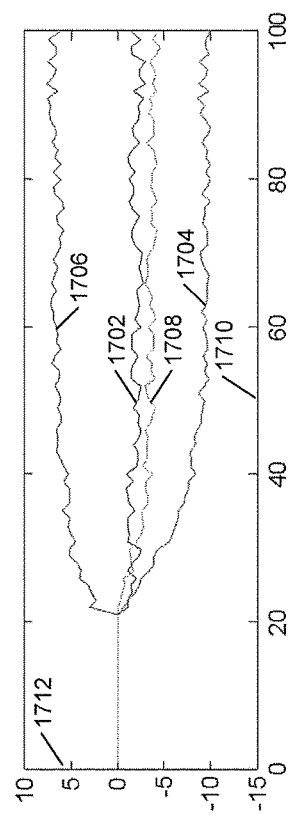

SYSTEM AND METHOD FOR ESTIMATING WHEN A PREDETERMINED PERCENTAGE OF FUEL IS BURNED IN A CYLINDER DURING AN ENGINE CYCLE USING PRINCIPAL COMPONENT ANALYSIS AND FOR CONTROLLING SPARK TIMING OF THE CYLINDER BASED ON THE PREDETERMINED PERCENTAGE

FIELD

The present disclosure relates to internal combustion engines, and more specifically, to systems and methods for estimating when a predetermined percentage of fuel is burned in a cylinder during an engine cycle using principal component analysis and for controlling spark timing of the cylinder based on the predetermined percentage.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Combustion phasing, or the time in an engine cycle when combustion in a cylinder occurs, affects the time when the cylinder produces its peak torque. Combustion phasing of a cylinder may be characterized by a crank angle at which the cylinder burns 50 percent of the fuel in the cylinder, which may be referred to as crank angle 50 (CA50). Engine controls systems control the CA50 of each cylinder of an engine in order to control the time when each cylinder produces its peak torque, and thereby balance the engine.

Engine control systems control the CA50 of a cylinder by adjusting the spark timing of the cylinder to minimize a difference between a desired CA50 and an estimated CA50. Engine control systems estimate the CA50 of a cylinder by measuring the pressure in the cylinder during an engine cycle and determining the total amount of heat released due to combustion in the cylinder during the engine cycle based on the measured cylinder pressure. The CA50 of a cylinder may be approximately equal to a crank angle at which 50 percent of the total amount of heat is released. Thus, engine control systems determine the crank angle at which 50 percent of the total amount of heat is released based on the total amount of heat released and a rate of heat release, and set the CA50 equal to the crank angle determined.

Estimating the CA50 of each cylinder of an engine in the manner described above requires a pressure sensor in each cylinder and involves a large computation burden, which can lead to a poor response time when controlling the CA50 of each cylinder. This poor response time decreases the effectiveness of the CA50 control, which can lead to cylinder imbalance and thereby decrease fuel efficiencies and degrade vehicle durability and drivability. In addition, the need for a pressure sensor in each cylinder increases manufacturing costs and may cause reliability issues.

SUMMARY

A system according to the present disclosure includes a first crank angle module, a second crank angle module, and a spark control module. The first crank angle module determines a first crank angle of an engine at which a predetermined percentage of fuel in a first cylinder of the engine is combusted based on M pressures in the first cylinder. The second crank angle module determines a relationship between the first crank angle and a second crank angle of the engine at which the predetermined percentage of fuel in a second cylinder of the engine is combusted based on N pressures in the first cylinder and N pressures in the second cylinder. M and N are integers greater than one. The spark control module adjusts spark timing of the first cylinder based on the first crank angle, and adjusts spark timing of the second cylinder based on the relationship between the first and second crank angles.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 15 is a graph illustrating the crank angles at which the predetermined percentage of fuel is burned in the cylinders over multiple engine cycles according to the principles of the present disclosure; and FIGS. 16 and 17 are graphs illustrating the PC coefficients and spark timing of the cylinders over multiple engine cycles according to the principles of the present disclosure.

In the drawings, reference numbers may be reused to identify similar and/or identical elements.

DETAILED DESCRIPTION

Figure 1:
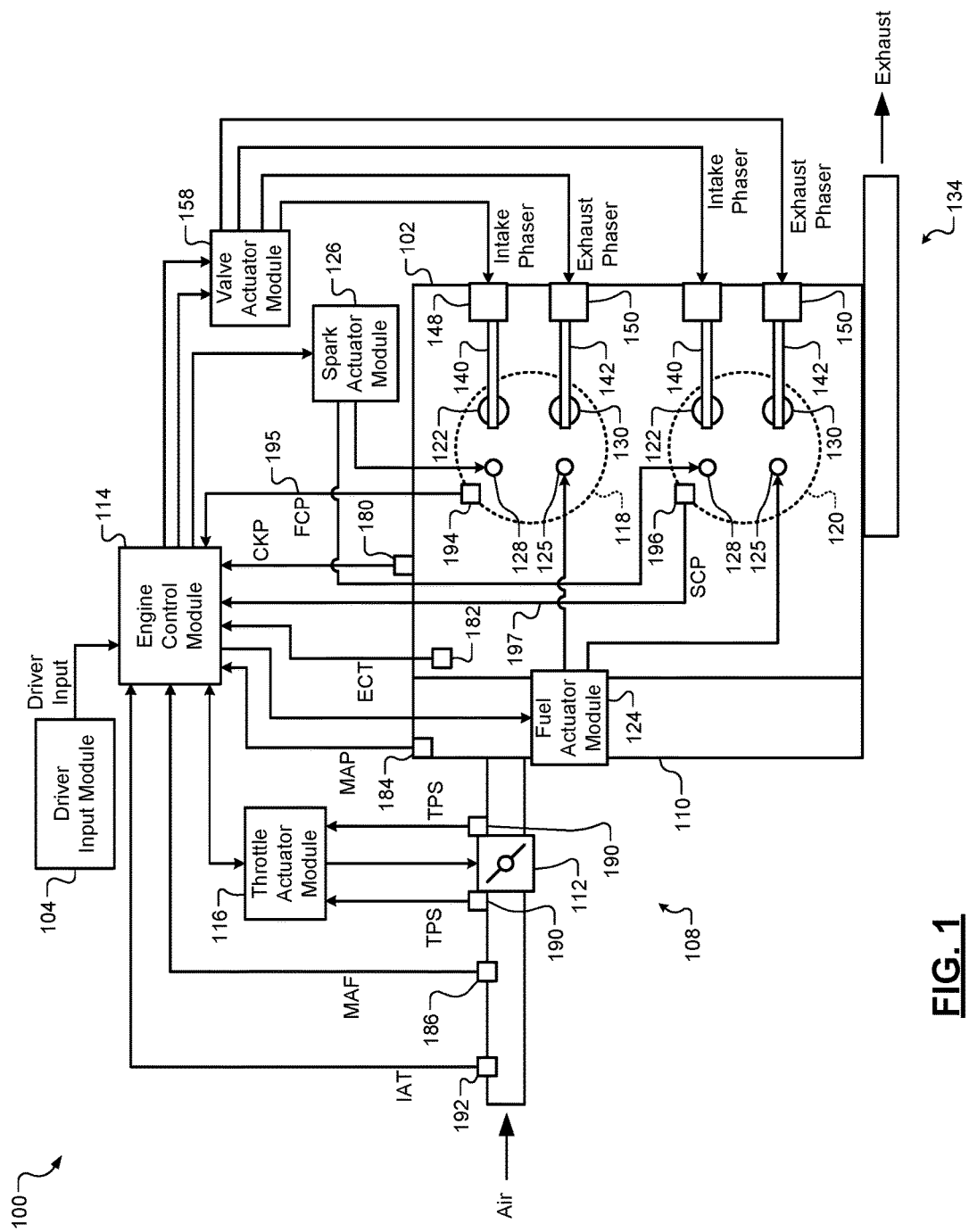
FIG. 1 is a functional block diagram of an example engine system according to the principles of the present disclosure.

A system and method according to the present disclosures estimates the CA50 of a first cylinder of an engine based on heat released in the first cylinder as described above, and adjusts the spark timing of that cylinder based on the estimated CA50. However, the system and method does not determine the CA50s of the other cylinders of the engine, at least not in the same manner. Instead, the system and method may determine relationships between the CA50s of the other cylinders and the CA50 of the first cylinder, and adjusts the spark timing of the other cylinders based on those relationships.

In one example, the system and method determines whether the CA50s of the other cylinders are greater than or less than the CA50 of the first cylinder. In another example, the system and method determines a difference between the CA50 of the first cylinder and the CA50 of each of the other cylinders. The system and method then advances or retards the spark timing of each of the other cylinders to minimize the differences between the CA50 of the first cylinder and the CA50s of the other cylinders.

The system and method may determine the relationships between the CA50 of the first cylinder and the CA50s of the other cylinders using principal component analysis. Principal component analysis is a statistical method that enables finding a pattern in a set of correlated data such as a set of cylinder pressure data. The system and method uses principal component analysis to determine principal component (PC) modes and PC coefficients characterizing the cylinder pressure data. The system and method may then determine the relationships between the CA50 of the first cylinder and the CA50s of the other cylinders based on a linear relationship between (i) the CA50s of all of the cylinders of the engine, and (ii) the PC coefficients of all of the cylinders of the engine.

Determining the relationships between the CA50s of the other cylinders and the CA50 of the first cylinder as described above instead of determining the CA50 for each cylinder based on the heat released in each cylinder reduces the computational burden. Reducing the computational burden may improve the response time of CA50 control and thereby increase the effectiveness of CA50 control, which may improve engine balancing. Improving engine balancing increases fuel efficiency and improves vehicle durability and drivability. In addition, a system and method according to the present disclosure eliminates the need for a pressure sensor in each cylinder, which decreases manufacturing costs and may reduce the number of reliability issues.

The inventors of the present application have discovered that PC coefficients of cylinders are approximately linearly related to the CA50s of the cylinders. Thus, in various implementations, the system and method may determine relationships between PC coefficients of the other cylinders and a PC coefficient of the first cylinder instead of or in addition to determining the relationships between the CA50s of the other cylinders and the CA50 of the first cylinder. In one examples, the system and method uses the relationships between the PC coefficients of the other cylinders and the PC coefficient of the first cylinder as approximations of the relationships between the CA50s of the other cylinders and the CA50 of the first cylinder. The system and method may then adjust the spark timing of the other cylinders based on those relationships to minimize the differences between the CA50 of the first cylinder and the CA50s of the other cylinders.

In the implementations described immediately above, the system and method may assume that the relationships between the CA50s of the cylinders are the same as or proportional to the relationships between the PC coefficients of the cylinders. Thus, by determining the relationships between PC coefficients of the other cylinders and the PC coefficient of the first cylinder, the system and method in effect determines the relationships between the CA50s of the other cylinders and the CA50 of the first cylinder. However, the system and method may not actually determine the CA50s of the other cylinders, or the relationships between the CA50s of the cylinders, in order to further reduce the computational burden and further improve the response time of CA50 control. In this regard, the system and method makes it possible to control the CA50s of the other cylinders without actually calculating the CA50s of the other cylinders.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. In the example shown, the engine 102 includes a first cylinder 118 and a second cylinder 120. However, the engine 102 may include more than two cylinders. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within each of the first and second cylinders 118 and 120. Therefore, two crankshaft revolutions are necessary for the first and second cylinders 118 and 120 to experience all four of the strokes. The engine 102 may complete an engine cycle when all cylinders of the engine 102 experience all four of the strokes. Thus, an engine cycle may correspond to two crankshaft revolutions or 720 degrees of crankshaft rotation.

During the intake stroke of each of the cylinders 118 and 120, air from the intake manifold 110 is drawn into the cylinders 118 and 120 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders 118 and 120. In various implementations, fuel may be injected directly into the cylinders 118 and 120 or into mixing chambers associated with the cylinders 118 and 120. The fuel actuator module 124 may halt injection of fuel to cylinders that are deactivated.

The injected fuel mixes with air and creates an air/fuel mixture in the cylinders 118 and 120. During the compression stroke of each of the cylinders 118 and 120, a piston (not shown) within each of the cylinders 118 and 120 compresses the air/fuel mixture. The engine 102 may be a compression-ignition engine, in which case compression in the cylinders 118 and 120 ignites the air/fuel mixture. Alternatively, the engine 102 may be a spark-ignition engine, in which case a spark actuator module 126 energizes a spark plug 128 to generate a spark in each of the cylinders 118 and 120 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for each of the cylinders 118 and 120 and/or may control the intake valves (including the intake valve 122) of multiple banks of cylinders (including the cylinders 118 and 120). Similarly, multiple exhaust camshafts (including the exhaust camshaft 142) may control multiple exhaust valves for each of the cylinders 118 and 120 and/or may control exhaust valves (including the exhaust valve 130) for multiple banks of cylinders (including the cylinders 118 and 120).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148 and 150 based on signals from the ECM 114. When implemented, variable valve lift may also be controlled by the valve actuator module 158.

The ECM 114 may deactivate each of cylinders 118 and 120 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may actuate the intake valve 122 and/or the exhaust valve 130 using devices other than camshafts, such as electromagnetic or electrohydraulic actuators.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The pressure in the first cylinder 118 may be measured using a first cylinder pressure (FCP) sensor 194. The FCP sensor 194 may generate an FCP signal 195 indicating the first cylinder pressure. The pressure in the second cylinder 120 may be measured using a second cylinder pressure (SCP) sensor 196. The SCP sensor 196 may generate a SCP signal 197 indicating the second cylinder pressure. The ECM 114 uses signals from the sensors to make control decisions for the engine system 100.

Figure 2:
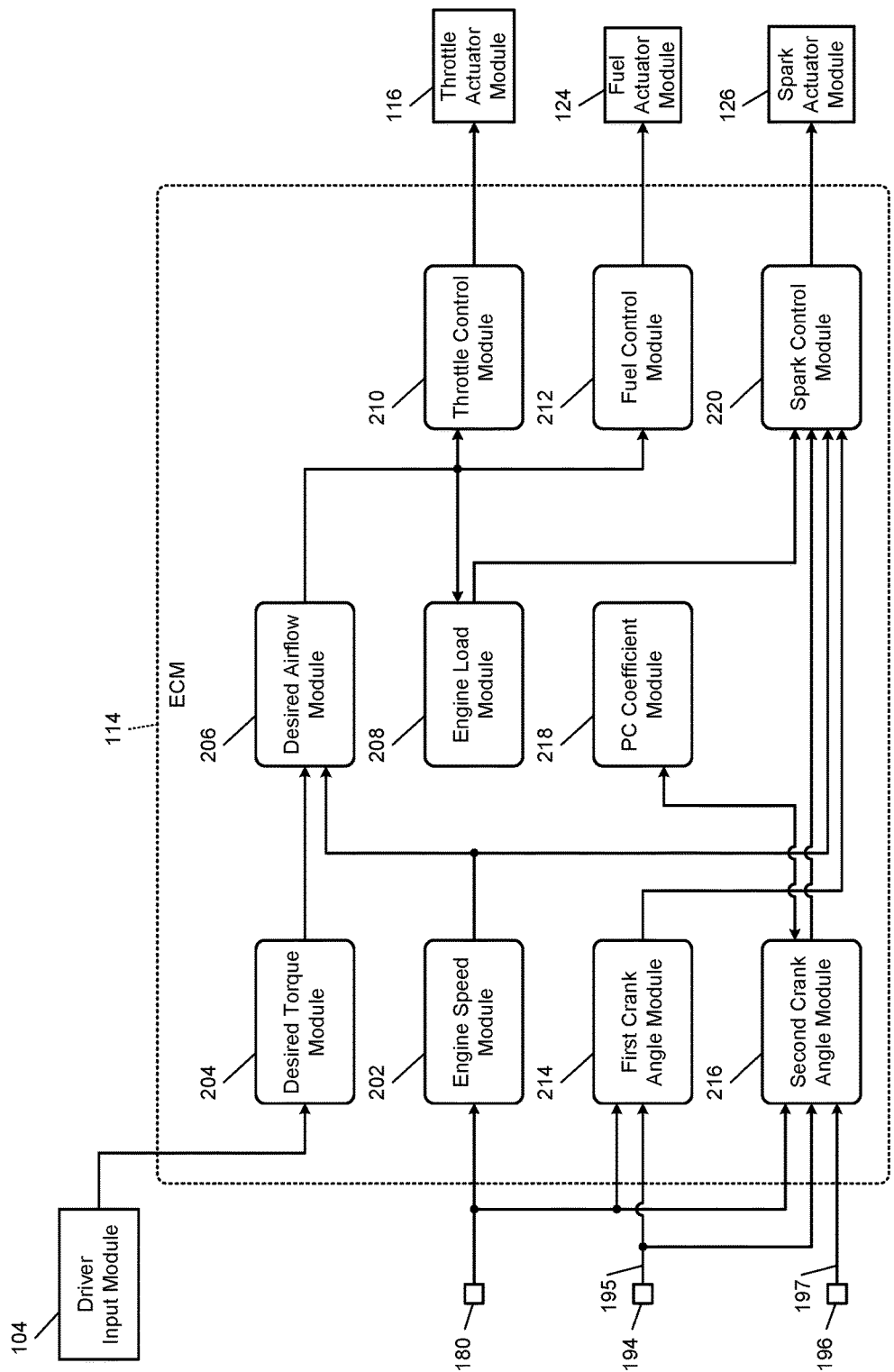
FIG. 2 is a functional block diagram of an example control system according to the principles of the present disclosure.

Referring now to FIG. 2, an example implementation of the ECM 114 includes an engine speed module 202, a desired torque module 204, a desired airflow module 206, an engine load module 208, a throttle control module 210, and a fuel control module 212. The engine speed module 202 determines the speed of the engine 102 based on the crankshaft position from the CKP sensor 180. For example, the engine speed module 202 may calculate the engine speed based on a period that elapses as the crankshaft completes one or more revolutions. The engine speed module 202 outputs the engine speed.

The desired torque module 204 determines a desired torque output of the engine 102 based on the driver input from the driver input module 104. The desired torque module 204 may store one or more mappings of accelerator pedal position, vehicle speed, and transmission gear to desired torque, and may determine the desired torque output based on a selected one of the mappings. The desired torque module 204 outputs the desired torque output.

The desired airflow module 206 determines a desired amount of airflow into the cylinders of the engine 102 based on the desired torque output and the engine speed. For example, the desired airflow module 206 may determine the desired airflow using a function and/or mapping that relates desired torque output and engine speed to desired airflow. The desired airflow module 206 may divide the desired airflow by the number of active cylinders in the engine 102 to obtain the desired amount of airflow into each cylinder of the engine 102, which may be referred to as a desired air per cylinder (APC). The desired airflow module 206 outputs the desired airflow.

The engine load module 208 determines the amount of load on the engine 102. The engine load module 208 may determine the engine load based on the desired airflow using, for example, a function and/or mapping that relates desired airflow to engine load. In various implementations, the engine load module 208 may determine the engine load based on a desired manifold pressure instead of or in addition to determining the engine load based on the desired airflow. The engine load module 208 outputs the engine load.

The throttle control module 210 outputs a desired throttle position, and the throttle actuator module 116 adjusts the position of the throttle valve 112 to achieve the desired throttle position. The fuel control module 212 outputs a desired fueling rate, and the fuel actuator module 124 controls the fuel injector 125 to achieve the desired fueling rate. The fuel control module 212 may also output desired injection timing, in which case the fuel actuator module 124 may also control the fuel injector 125 to achieve the desired injection timing.

The throttle control module 210 may adjust the throttle position based on the desired airflow. The fuel control module 212 may adjust the fueling rate based on the desired airflow, the desired air/fuel ratio, and/or a measured air/fuel ratio. For example, the fuel control module 212 may adjust the desired fueling rate to minimize a difference between the desired air/fuel ratio and the measured air/fuel ratio. In another example, the fuel control module 212 may determine a desired fuel flow based on the desired airflow and the desired air/fuel ratio, and may adjust the desired fueling rate to achieve the desired fuel flow.

The example implementation of the ECM 114 shown in FIG. 2 further includes a first crank angle module 214, a second crank angle module 216, a principal component (PC) coefficient module 218, and a spark control module 220. The first crank angle module 214 determines a first crank angle at which a predetermined percentage of fuel in the first cylinder 118 is combusted during an engine cycle. For example, the predetermined percentage may be 50 percent, in which case the first crank angle may be referred to as CA50. The first crank angle module 214 outputs the first crank angle.

The first crank angle module 214 may determine the first crank angle based on the first cylinder pressure from the FCP sensor 194 and the crankshaft position from the CKP sensor 180. In one example, the first crank angle module 214 samples the FCP signal 195 and the signal from the CKP sensor 180 at a first rate during one engine cycle to obtain a first number of pressure samples and the corresponding crank angles. The first rate may be once per degree of crankshaft rotation, in which case the first crank angle module 214 obtains 720 pressure samples and 720 corresponding crank angles for each engine cycle. The first crank angle module 214 may then determine the first crank angle for that engine cycle based on the pressure samples obtained and the corresponding crank angles.

The first crank angle module 214 may determine an amount of heat released in the first cylinder 118 during the engine cycle based on the pressure in the first cylinder 118, and determine the first crank angle based on the amount of heat released. To this end, the percentage of fuel that is combusted in the first cylinder 118 may be equal to the percentage of heat released in the first cylinder 118 relative to a total amount of heat released in the first cylinder 118 during an engine cycle. Thus, the first crank angle module 214 may determine a crank angle at which a predetermined percentage of the total amount of heat is released, and set the first crank angle equal to that crank angle.

The first crank angle module 214 may determine the amount of heat released in the first cylinder 118 during the engine cycle using a relationship such as $$Q_c = \int \frac{dQ_c}{d\theta} d\theta \tag{1}$$

where $Q_c$ is the amount of heat released, $\theta$ is the crank angle of the engine 102, and $$\frac{dQ_c}{d\theta}$$

is a rate of change in the amount of heat released with respect to the crank angle of the engine 102.

The first crank angle module 214 may determine the rate of change in the amount of heat released with respect to the crank angle of the engine 102 using a relationship such as $$\frac{dQ_c}{d\theta} = \frac{\gamma}{\gamma-1} P \frac{dV}{d\theta} + \frac{1}{\gamma-1} V \frac{dP}{d\theta} + \frac{dQ_{loss}}{d\theta} \tag{2}$$

where $\gamma$ is the heat capacity ratio of the air/fuel mixture in the first cylinder 118, P is pressure in the first cylinder 118, V is the volume of the first cylinder 118, $$\frac{dV}{d\theta}$$

is a rate of change in the volume of the first cylinder 118 with respect to the crank angle of the engine 102, $$\frac{dP}{d\theta}$$

is a rate of change in the pressure in the first cylinder 118 with respect to the crank angle of the engine 102, $$\frac{dQ_{loss}}{d\theta}$$

is a rate at which heat is lost or transferred to a boundary of the first cylinder 118 (e.g., a cylinder wall, a cylinder head, the piston).

The first crank angle module 214 may determine the rate of heat loss to the first cylinder boundary based on the rate of change in the first cylinder pressure with respect to the crank angle, the temperature in the first cylinder 118, and a heat transfer coefficient. The first crank angle module 214 may determine the rate of change in the first cylinder pressure with respect to the crank angle using a relationship such as $$\frac{dP}{d\theta_j} = \frac{P_{j+1} - P_j}{\theta_{j+1} - \theta_j} \tag{3}$$

where $\theta_j$ is a crank angle j of the engine 102, $\theta_{j+1}$ is a crank angle j+1 of the engine 102 (i.e., the crank angle after the crank angle j), $P_j$ is the first cylinder pressure at the crank angle j, and $P_{j+1}$ is the first cylinder pressure at the crank angle j+1.

The second crank angle module 216 may determine a second crank angle at which the predetermined percentage of fuel is combusted in the second cylinder 120 during the same engine cycle for which the first crank angle is determined. Additionally or alternatively, the second crank angle module 216 may determine a relationship between the second crank angle and the first crank angle. In one example, the second crank angle module 216 determines whether the second crank angle is greater than or less than the first crank angle. In another example, the second crank angle module 216 determines a difference between the first and second crank angles.

The second crank angle module 216 may determine the relationship between the first and second crank angles based on the first cylinder pressure from the FCP sensor 194, the second cylinder pressure from the SCP sensor 196, and the crankshaft position from the CKP sensor 180. In one example, the second crank angle module 216 samples the FCP signal 195 and the SCP signal 197 at a second rate during one engine cycle to obtain a second number of samples of each of the first and second cylinder pressures. The second crank angle module 216 may also sample the signal from the CKP sensor 180 at the second rate to obtain the crank angles corresponding to the pressure samples. The second crank angle module 216 may then determine the relationship between the first and second crank angles for that engine cycle based on the pressure samples obtained and the corresponding crank angles.

The second rate may be less than the first rate, and therefore the second number of pressure samples obtained during the engine cycle may be less than the first number of pressure samples obtained during the engine cycle. In one example, the first rate may be once per degree of crankshaft rotation, and the second rate may be once every 60 degrees of crankshaft rotation. Thus, the first number of samples may be 720, and the second number of samples may be 12. In other examples, the second number of samples may be less than 12 (e.g., 5 or 10).

The second crank angle module 216 may determine the relationship between the first and second crank angles based on differences between the first cylinder pressure samples and the second cylinder pressure samples. In one example, for each crank angle at which the pressure samples are obtained, the second crank angle module 216 determines an average value of the first cylinder pressure and the second cylinder pressure. The second crank angle module 216 then determines a first difference between the first cylinder pressure and the average value, and determines a second difference between the second cylinder pressure and the average value. Thus, the number of first differences and the number of second differences are each equal to the second number of pressure samples obtained during the engine cycle.

The second crank angle module 216 outputs a signal to the PC coefficient module 218 indicating the first and second differences for each engine cycle. Then, for each engine cycle, the PC coefficient module 218 determines a first PC coefficient of the first cylinder 118 and a second PC coefficient of the second cylinder 120 based on the first and second differences using principal component analysis. The PC coefficient module 218 outputs the first and second PC coefficients, and the second crank angle module 216 may determine one or more relationship between the first and second crank angles based on the first and second PC coefficients.

In one example, the second crank angle module 216 determines whether the second crank angle is greater than or less than the first crank angle based on a predetermined relationship between (i) the first and second crank angles and (ii) the first and second PC coefficients. In another example, the second crank angle module 216 determines the difference between the first and second crank angles based on the predetermined relationship. The predetermined relationship may be a linear relationship.

The second crank angle module 216 outputs a signal to the spark control module 220 indicating the second crank angle and/or the relationship between the first and second crank angles. The signal output to the spark control module 220 may indicate whether the second crank angle is greater than or less than the first crank angle. Additionally or alternatively, the signal output to the spark control module 220 may indicate the difference between the first and second crank angles.

In various implementations, the engine 102 may include more than two cylinders, and the second crank angle module 216 may determine a crank angle at which the predetermined percentage of fuel is combusted in each cylinder other than the first cylinder 118 during the same engine cycle for which the first crank angle is determined. Additionally or alternatively, the second crank angle module 216 may determine a relationship between (i) the crank angle for each of the other cylinders and (ii) the first crank angle. In one example, the second crank angle module 216 determines whether the crank angle for each of the other cylinders is greater than or less than the first crank angle. In another example, the second crank angle module 216 determines a difference between (i) the crank angle for each of the other cylinders and (ii) the first crank angle. The second crank angle module 216 may determine the relationship between (i) the crank angle for each of the other cylinders and (ii) the first crank angle in the same way that the second crank angle module 216 determines the relationship between the first and second crank angles.

When determining the first and second PC coefficients, the PC coefficient module 218 may represent all measurements of each of the first and second cylinder pressures taken over several engine cycles in matrix (e.g., vector) format. In addition, the separate each of the first and second cylinder pressures into the average value of the first and second cylinder pressures and the respective pressure difference as described above. For example, the PC coefficient module 218 may separate each of the first and second cylinder pressures using a relationship such as $$\{p(t,n)\}=\{u(t)\}+\{\delta(t,n)\} \quad (4)$$

where p(t,n) is the pressure in each cylinder as a function of time t (or crank angle) and cylinder number n, u(t) is the average value of the first and second cylinder pressures at the time t (or crank angle), and $\delta(t,n)$ is the pressure difference associated with each cylinder as a function of the time t (or crank angle) and the cylinder number n.

The pressure difference associated with each cylinder is dependent (coupled) because its covariance matrix has non-zero off-diagonal elements. The PC coefficient module 218 may determine the covariance matrix of the pressure difference associated with each cylinder using a relationship such as $$\text{covariance matrix} = \left[\frac{\delta(t_i, n)\delta^T(t_j, n)}{n-1}\right] \quad (5)$$

where $\delta(t_i,n)$ is the pressure difference associated with each cylinder as a function of time $t_i$ (or crank angle) and the cylinder number n, and $\delta^T(t_i,n)$ is the transpose matrix of the pressure difference associated with each cylinder as a function of time $t_j$ (or crank angle) and the cylinder number n.

When performing the principal component analysis, the PC coefficient module 218 may decompose the pressure difference associated with each cylinder into a linear superposition of orthogonal principal component modes using a relationship such as $$\{\delta(t,n)\}=[\varnothing(t,m)]\{\eta(m,n)\} \quad (6)$$

where m is mode number, $\varnothing(t,m)$ represents the orthogonal principal component modes as a function of mode number m and cylinder number n, and $\eta(m,n)$ represents modal coefficients of the orthogonal principal component modes as a function of mode number m and cylinder number n.

The PC coefficient module 218 may calculate the modal coefficients of the orthogonal principal component modes using a relationship such as $$\{\eta(m,n)\}=[\varnothing^{-1}]\{\delta(t,n)\}=[\varnothing^T]\{\delta(t,n)\}. \quad (7)$$

The orthogonal principal component modes $\varnothing(t,m)$ are eigenvectors of the covariance matrix of the pressure difference $\delta(t,n)$, as indicated by the following relationship $$\left[\frac{\delta(t_i,n)\delta^T(t_j,n)}{n-1}\right][\varnothing] = [\varnothing][\lambda(m)] \quad (8)$$

where $[\lambda(m)]$ is a diagonal matrix of eigenvalues representing the PC coefficients for the corresponding eigenvectors (PC modes).

The spark control module 220 outputs a desired spark timing, and the spark actuator module 126 controls the spark plug 128 to achieve the desired spark timing. The spark control module 220 adjusts the desired spark timing of the first cylinder 118 to minimize a difference between the first crank angle and a desired crank angle. If the first crank angle is referred to as CA50, the desired crank angle may be referred to as a desired CA50. In one example, the spark control module 220 minimizes the difference between the first crank angle and the desired crank angle by adjusting the desired spark timing of the first cylinder 118 using proportional integral (PI) control. The spark control module 220 determines the desired crank angle based engine operating conditions such as the engine load and the engine speed.

The spark control module 220 adjusts the desired spark timing of the second cylinder 120 to minimize a difference between the first PC coefficient and the second PC coefficient. In one example, the spark control module 220 minimizes the difference between the first and second PC coefficients by adjusting the desired spark timing of the second cylinder 120 using PI control. The spark control module 220 may also adjust the desired spark timing of the second cylinder 120 based engine operating conditions such as the engine load and the engine speed.

Figure 3:
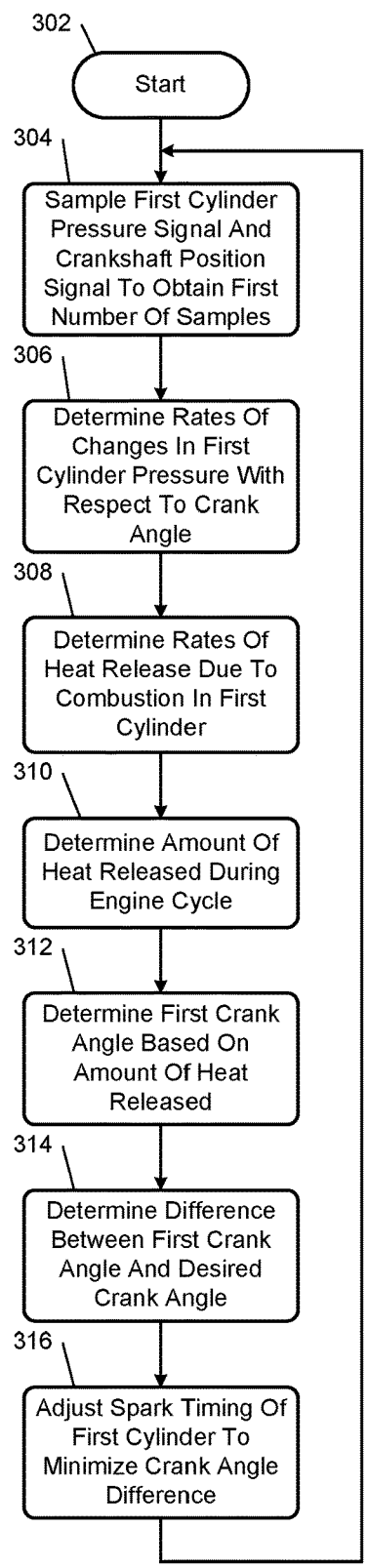
FIG. 3 is a flowchart illustrating a first example method for controlling spark timing according to the principles of the present disclosure.

Referring now to FIG. 3, a method for determining the first crank angle based on heat released in the first cylinder 118 due to combustion during an engine cycle and for adjusting the spark timing of the first cylinder 118 based on the first crank angle begins at 302. The method is described in the context of the modules of FIG. 2. However, the particular modules that perform the steps of the method may be different than the modules mentioned below and/or the method may be implemented apart from the modules of FIG. 2.

Figure 4:
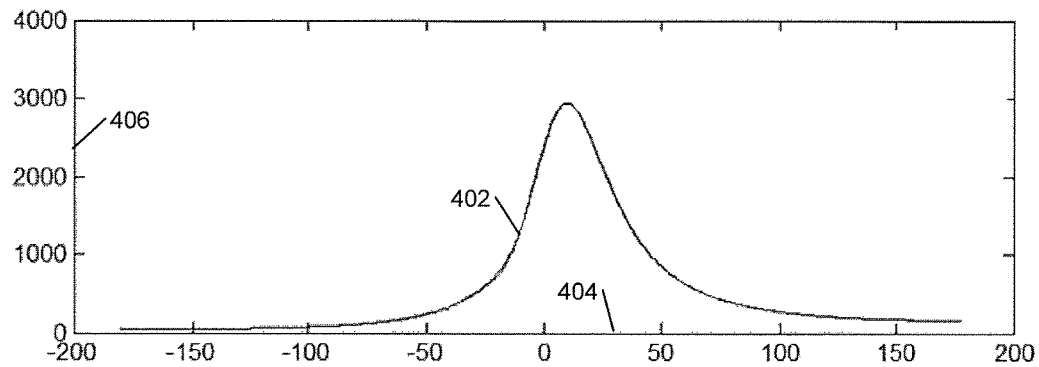
FIGS. 4 through 6 are graphs illustrating an example cylinder pressure signal, an example heat release rate signal, and a heat release signal according to the principles of the present disclosure.

At 304, the first crank angle module 214 samples the FCP signal 195 and the signal from the CKP sensor 180 at the first rate during one engine cycle to obtain the first number of samples of the pressure in the first cylinder 118 and the corresponding crank angles. FIG. 4 shows the first cylinder pressure samples and the corresponding crank angles plotted as a cylinder pressure signal 402 with respect to an x-axis 404 that represents crank angle in degrees and a y-axis 406 that represents cylinder pressure in kilopascals (kPa). Although the x-axis 404 only includes a crank angle rage from −200 degrees to 200 degrees, the method may sample the FCP signal 195 and the signal from the CKP sensor 180 over an entire engine cycle (e.g., from −360 degrees to 360 degrees).

At 306, the first crank angle module 214 determines the rates of changes in the first cylinder pressure with respect to the crank angle of the engine 102. The first crank angle module 214 determines the rate of change in the first cylinder pressure for each crank angle at which the first cylinder pressure is sampled relative to the previous crank angle using relationship (3) as described above. Thus, the number of pressure change rates determined may be equal to the first number of pressure samples obtained during the engine cycle.

Figure 5:
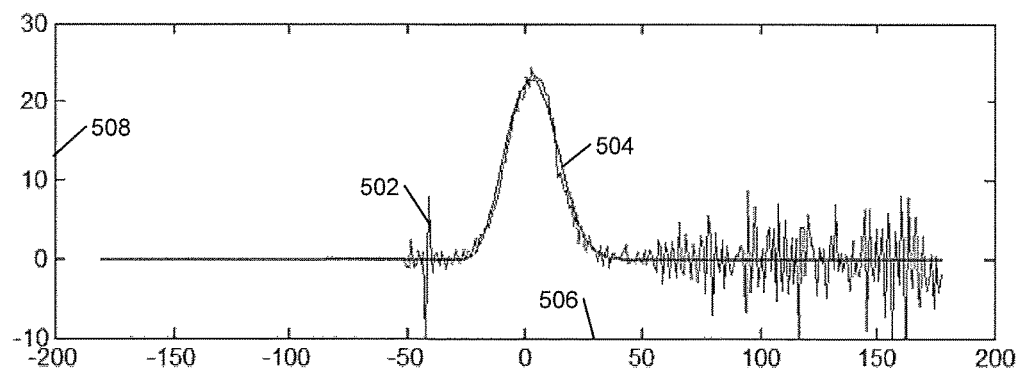

At 308, the first crank angle module 214 determines the heat release rate for each crank angle at which the first cylinder pressure is sampled relative to the previous crank angle using relationship (2) as described above. Thus, the number of heat release rates determined may be equal to the first number of pressure samples obtained during the engine cycle. FIG. 5 shows examples of an unfiltered heat release rate signal 502 and a filtered heat release rate signal 504 plotted with respect to an x-axis 506 that represents crank angle and a y-axis that represents heat release rate in joules per degree.

At 310, the first crank angle module 214 determines the amount of heat released during the engine cycle using relationship (1) as described above. The first crank angle module 214 may integrate each heat release rate determined at 308 according to relationship (1) to obtain a corresponding amount of heat released. Thus, the number of heat release amounts may be equal to the number of heat release rates. Also, at 310, the first crank angle module 214 may sum the heat release amounts to obtain the total amount of heat released due to combustion in the first cylinder 118 during the engine cycle.

Figure 6:
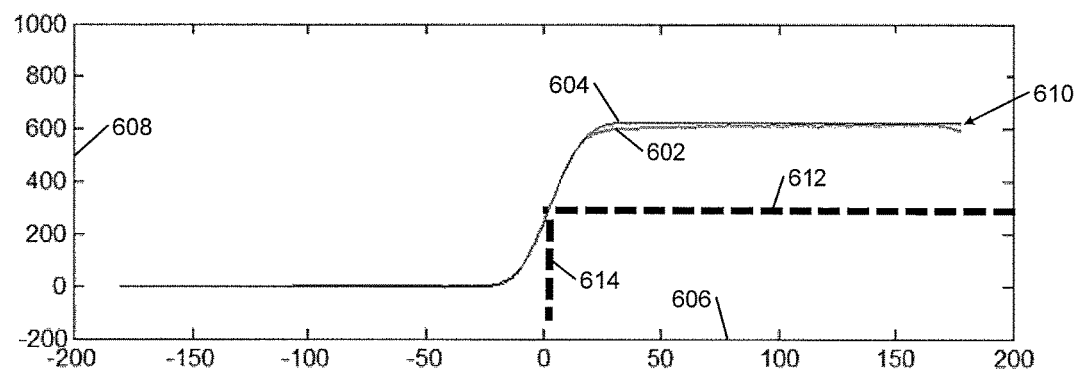

FIG. 6 shows an example of an unfiltered heat release signal 602 and a filtered heat release signal 604 plotted with respect to an x-axis 606 that represents crank angle in degrees and a y-axis 608 that represents heat release in joules (J). The heat release signals 602 and 604 represent the sum of the heat release amounts at various crank angles. Thus, the right ends of the heat release signals 602 and 604, labelled 610, represent the total amount of heat released due to combustion in the first cylinder 118 during the engine cycle. The total heat release amount 610 is approximately 600 J.

At 312, the first crank angle module 214 determines the first crank angle based on the total amount of heat released due to combustion in the first cylinder 118 during the engine cycle. In one example, the first crank angle module 214 determines a first amount of heat release corresponding to the predetermined percentage of the total amount of heat released. Then, starting with the heat release amount corresponding to the start of the engine cycle, the first crank angle module 214 sums the heat release amounts. The first crank angle module 214 identifies the crank angle at which the sum is equal to the first amount of heat release, or at least nearest to the first amount relative to the other crank angles for which the heat release amounts are determined. The first crank angle module 214 sets the first crank angle equal to the crank angle identified. In FIG. 6, the first amount of heat release is labelled 612 and is approximately 300 J, and the crank angle identified is labelled 614 and is approximately 0 degrees.

At 314, the spark control module 220 determines the difference between the first crank angle and the desired crank angle. At 316, the spark control module 220 adjusts the spark timing of the first cylinder 118 to minimize the difference between the first crank angle and the desired crank angle using, for example, PI control.

Figure 7:
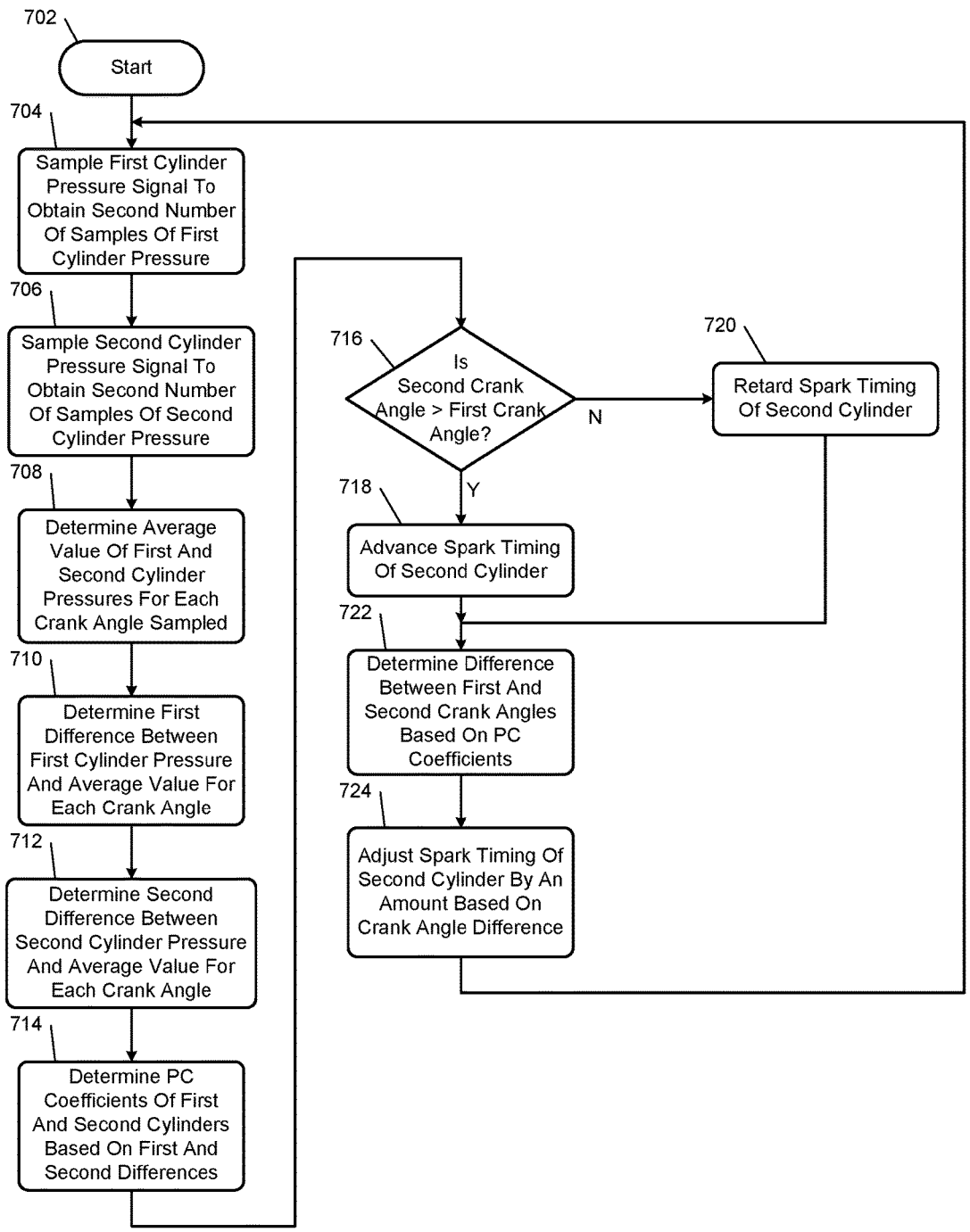
FIG. 7 is a flowchart illustrating a second example method for controlling spark timing according to the principles of the present disclosure.

Referring now to FIG. 7, an example method for determining one or more relationships between the first and second crank angles and for controlling the spark timing of the second cylinder 120 based on the relationship(s) determined begins at 702. The method is described in the context of the modules of FIG. 2. However, the particular modules that perform the steps of the method may be different than the modules mentioned below and/or the method may be implemented apart from the modules of FIG. 2.

At 704, the second crank angle module 216 samples the FCP signal 195 at the second rate during one engine cycle to obtain the second number of samples the pressure in the first cylinder 118. At 706, the second crank angle module 216 samples the SCP signal 197 at the second rate during the same engine cycle to obtain the second number of samples the pressure in the second cylinder 120. The second crank angle module 216 may also sample the signal from the CKP sensor 180 at the second rate to obtain the crank angles corresponding to the cylinder pressure samples.

Figure 8:
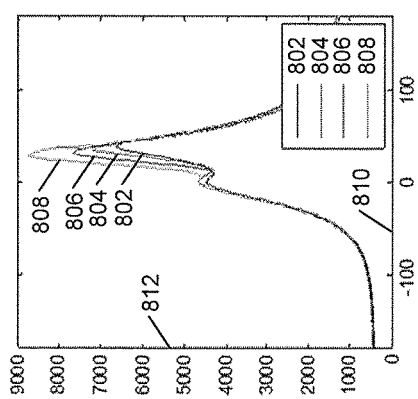

FIG. 8 shows example cylinder pressure signals 802-808 plotted with respect to an x-axis 810 that represents crank angle in degrees and a y-axis 812 that represents pressure in kPa. The engine 102 may include four cylinders, as noted above, and the cylinder pressure signals 802-808 may indicate example pressures in those four cylinders during an engine cycle. A first cylinder pressure signal 802 indicates pressure in the first cylinder 118. A second cylinder pressure signal 804 indicates pressure in the second cylinder 120. A third cylinder pressure signal 806 indicates pressure in a third cylinder (not shown) of the engine 102. A fourth cylinder pressure signal 808 indicates pressure in a fourth cylinder (not shown) of the engine 102.

Figure 9:
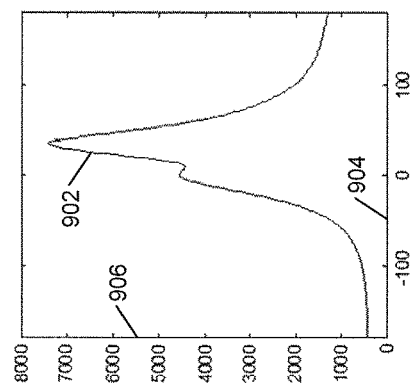

At 708, the second crank angle module 216 determines the average value of the first and second cylinder pressures for each of the crank angles at which the FCP signal 195 and the SCP signal 197 are sampled. FIG. 9 shows an example average cylinder pressure signal 902 plotted with respect to an x-axis 904 that represents crank angle in degrees and a y-axis 906 that represents pressure in kPa. The second crank angle module 216 may determine the average value of the cylinder pressure signals 802-808 of FIG. 8 in order to obtain the average cylinder pressure signal 902 of FIG. 9.

At 710, the second crank angle module 216 determines the first difference between the first cylinder pressure and the average value of the first and second cylinder pressures for each of the crank angles at which the FCP signal 195 and the SCP signal 197 are sampled. At 712, the second crank angle module 216 determines the second difference between the second cylinder pressure and the average value of the first and second cylinder pressures for each of the crank angles at which the FCP signal 195 and the SCP signal 197 are sampled.

Figure 10:
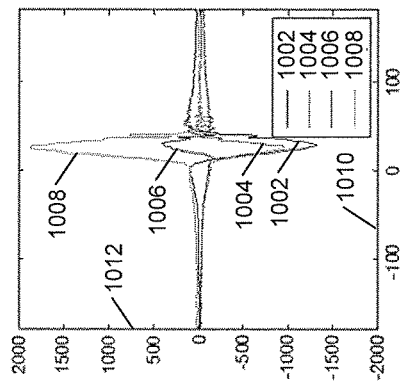
FIGS. 8 through 12 are graphs illustrating example cylinder pressure signals, example principal component (PC) mode signals, and example PC coefficients according to the principles of the present disclosure.

FIG. 10 shows example cylinder pressure difference signals 1002-1008 plotted with respect to an x-axis 1010 that represents crank angle in degrees and a y-axis 1012 that represents pressure in kPa. A first cylinder pressure difference signal 1002 indicates the first difference (e.g., the difference between the first cylinder pressure signal 802 and the average cylinder pressure signal 902). A second cylinder pressure difference signal 1004 indicates the second difference (e.g., the difference between the second cylinder pressure signal 804 and the average cylinder pressure signal 902). A third cylinder pressure difference signal 1006 indicates a third difference (e.g., the difference between the third cylinder pressure signal 806 and the average cylinder pressure signal 902). A fourth cylinder pressure difference signal 1008 indicates a fourth difference (e.g., the difference between the fourth cylinder pressure signal 808 and the average cylinder pressure signal 902).

At 714, the PC coefficient module 218 determines the first PC coefficient of the first cylinder 118 and the second PC coefficient of the second cylinder 120 based on the first and second differences. The PC coefficient module 218 may also determine PC modes of the first and second cylinders 118 and 120 based on the first and second differences. The PC coefficient module 218 may determine the first and second PC coefficients and the PC modes using principal component analysis as described above with respect to relationships (4) through (8).

While the PC coefficients may be associated with a particular cylinder of the engine 102, the PC modes may be associated with all of the cylinders of the engine 102. The number of PC modes determined may be less than or equal to the number of cylinder pressure signals, and the number of PC coefficients determined for each cylinder may be equal to the number of PC modes determined. The first PC coefficient may correspond to PC mode 1 of the first cylinder 118, and the second PC coefficient may correspond to PC mode 1 of the second cylinder 120.

Figure 12:
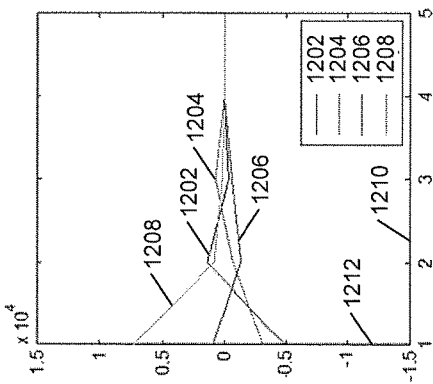
Figure 11:
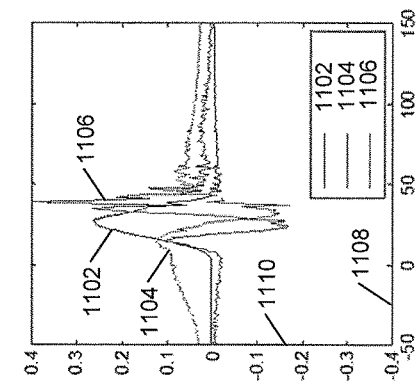

FIG. 11 shows example PC mode signals 1102-1106 plotted with respect to an x-axis 1108 that represents crank angle in degrees and a y-axis 1110 that represents pressure in kPa. The PC mode signals 1102-1106 include a first PC mode signal 1102, a second PC mode signal 1104, and a third PC mode signal 1106. FIG. 12 shows example PC coefficient signals 1202-1208 plotted with respect to an x-axis 1210 that represents PC mode identification or number (e.g., PC mode 1) and a y-axis 1212 that represents the magnitude of the PC coefficients. The PC coefficient signals 1202-1208 include a first PC coefficient signal 1202 indicating the PC coefficients of the first cylinder 118, a second PC coefficient signal 1204 indicating the PC coefficients of the second cylinder 120, a third PC coefficient signal 1206 indicating the PC coefficients of the third cylinder, and a fourth PC coefficient signal 1204 indicating the PC coefficients of the fourth cylinder. In the example shown, the PC mode 1 coefficient indicated by the first PC coefficient signal 1202 is approximately 0.75, and the PC mode 1 coefficient indicated by the second PC coefficient signal 1204 is approximately −0.5.

The PC mode signals 1102-1106 may be multiplied by the corresponding PC coefficients indicated by the PC coefficient signals 1202-1208 to reproduce the cylinder pressure difference signals 1002-1008 of FIG. 10. For example, to reproduce the first cylinder pressure difference signal 1002, the first PC mode signal 110 may be multiplied by the PC mode 1 coefficient indicated by the first PC coefficient signal 1202, the second PC mode signal 1104 may be multiplied by the PC mode 2 coefficient indicated by the first PC coefficient signal 1202, and the third PC mode signal 110 may be multiplied by the PC mode 3 coefficient indicated by the first PC coefficient signal 1202.

At 716, the second crank angle module 216 determines whether the second crank angle is greater than the first crank angle based on the predetermined relationship between (i) the first and second crank angles and (ii) the first and second PC coefficients. As noted above, the predetermined relationship may be a linear relationship. If the second crank angle is greater than the first crank angle, the method continues at 718. Otherwise, the method continues at 720. At 718, the spark control module 220 advances the spark timing of the second cylinder 120. At 720, the spark control module retards the spark timing of the second cylinder 120.

In various implementations, at 716, the second crank angle module 216 may simply determine whether the second PC coefficient of the second cylinder 120 is less than the first PC coefficient of the first cylinder 118. Since the relationship between (i) the first and second crank angles and (ii) the first and second PC coefficients may be linear, the second crank angle may be greater than the first crank angle when the second PC coefficient is less than the first PC coefficient. In these implementations, if the second PC coefficient is less than the first PC coefficient, the method continues at 718. Otherwise, the method continues at 720.

At 722, the second crank angle module 216 determines the difference between the first and second crank angles based on the predetermined relationship between (i) the first and second crank angles and (ii) the first and second PC coefficients. At 724, the spark control module 220 adjusts the spark timing by an amount that is directly proportional to the difference between the first and second crank angles. In one example, if the second crank angle module 216 adjusts the spark timing by an amount that is equal to the difference between the first and second crank angles.

In various implementations, at 722, the second crank angle module 216 may simply determine the difference between the first and second PC coefficients. Since the relationship between (i) the first and second crank angles and (ii) the first and second PC coefficients may be linear, the difference between the first and second PC coefficients may be directly proportional to the difference between the first and second crank angles. In these implementations, at 724, the spark control module 220 adjusts the spark timing by an amount that is directly proportional to the difference between the first and second PC coefficients.

The second crank angle module 216 may execute both 716 and 722 before the spark control module 220 adjusts the spark timing of the second cylinder 120. Then, the spark control module 220 may advance or retard the spark timing by an amount that is directly proportional to the difference between the first and second crank angles. The method of FIG. 7 may be executed once for each engine cycle.

Figure 13:
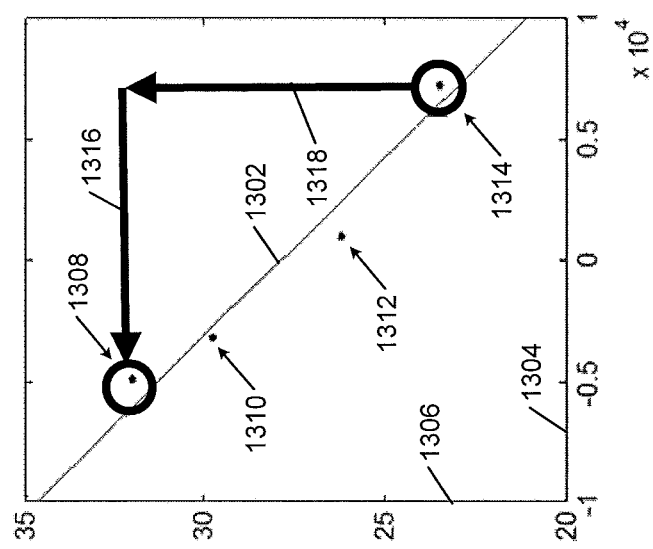

FIG. 13 shows an example of an approximately linear relationship 1302 between PC mode 1 coefficients of the four cylinders of the engine 102 and CA50 values for the four cylinders of the engine 102. The linear relationship 1302 is plotted with respect to an x-axis 1304 that represents the magnitude of the PC mode 1 coefficients and a y-axis 1306 that represents crank angle in degrees. The approximately linear relationship 1302 may be predetermined based on data points 1308-1314 using a statistical method such as linear regression. The data points 1308-1314 include a first data point 1308 indicating the PC mode 1 coefficient of the first cylinder 118 and the CA50 of the first cylinder 118, a second data point 1310 indicating the PC mode 1 coefficient of the second cylinder 120 and the CA50 of the second cylinder 120, a third data point 1312 indicating the PC mode 1 coefficient of the third cylinder and the CA50 of the third cylinder, and a fourth data point 1314 indicating the PC mode 1 coefficient of the fourth cylinder and the CA50 of the fourth cylinder.

When predetermining the linear relationship 1302, the CA50 values indicated by the data points 1308-1314 may be determined based on the amount of heat released in each of the four cylinders of the engine using relationships (1) through (3) listed above. However, once the linear relationship 1302 is determined, it is not necessary to determine the CA50 values of all four cylinders. Instead, the first crank angle module 214 may determine the CA50 of only the first cylinder 118, and the second crank angle module 216 may estimate the CA50 of the other cylinders of the engine 102 based on the PC mode 1 coefficient of the other cylinders and the linear relationship 1302.

In various implementations, the second crank angle module 216 may not estimate the exact CA50 values of the cylinders of the engine 120 other than the first cylinder 118. Instead, the second crank angle module 216 may simply determine whether the CA50 of the other cylinders greater than or less than the CA50 of the first cylinder 118. The spark control module 220 may then adjust the spark timing of the other cylinders to decrease the differences between (i) the CA50 of the other cylinders, and (ii) the CA50 of the first cylinder 118.

For example, in FIG. 13, the PC mode 1 coefficient of the fourth cylinder indicated by the fourth data point 1314 is greater than the PC mode 1 coefficient of the first cylinder 118 indicated by the first data point 1308. Thus, based on the linear relationship 1302, the second crank angle module 216 may determine that the CA50 of the fourth cylinder is less than the CA50 of the first cylinder 118. Therefore, the spark control module 220 may retard the spark timing of the fourth cylinder to decrease the difference between the CA50 of the fourth cylinder and the CA50 of the first cylinder 118. The spark control module 220 may adjust the spark timing of the second and third cylinders in a similar manner to decrease the differences between (i) the CA50 values of the second and third cylinders, and (ii) the CA50 of the first cylinder 118.

In various implementations, the second crank angle module 216 may determine the differences between (i) the CA50 values of the cylinders of the engine 102 other than the first cylinder 118 and (ii) the CA50 of the first cylinder 118. The second crank angle module 216 may determine these differences based on the linear relationship 1302 and the differences between (i) the PC mode 1 coefficient of the other cylinders and (ii) the PC mode 1 coefficient of the first cylinder 118. Thus, the second crank angle module 216 may use the linear relationship 1302 to determine whether, and by how much, the CA50 values of the other cylinders are greater than or less than the CA50 of the first cylinder 118. The spark control module 220 may then adjust (e.g., advance or retard) the spark timing of each of the other cylinders by an amount that is equal to a corresponding one of the differences between the CA50 values.

For example, in FIG. 13, the PC mode 1 coefficient of the fourth cylinder indicated by the fourth data point 1314 is approximately $0.75 \times 10^4$, and the PC mode 1 coefficient of the first cylinder 118 indicated by the first data point 1308 is approximately $-0.5 \times 10^4$. Thus, a difference 1316 between the PC mode 1 coefficients of the two cylinders is approximately $1.25 \times 10^4$. Therefore, the second crank angle module 216 may multiply this difference by the slope of the linear relationship 1302, which may be a fixed value, to obtain a difference 1318 between the CA50 of the first cylinder 118 and the CA50 of the fourth cylinder. The spark control module 220 may then adjust (e.g., retard) the spark timing of the fourth cylinder by an amount that is equal to the difference 1318 between the CA50 of the first cylinder 118 and the CA50 of the fourth cylinder.

Figure 14:
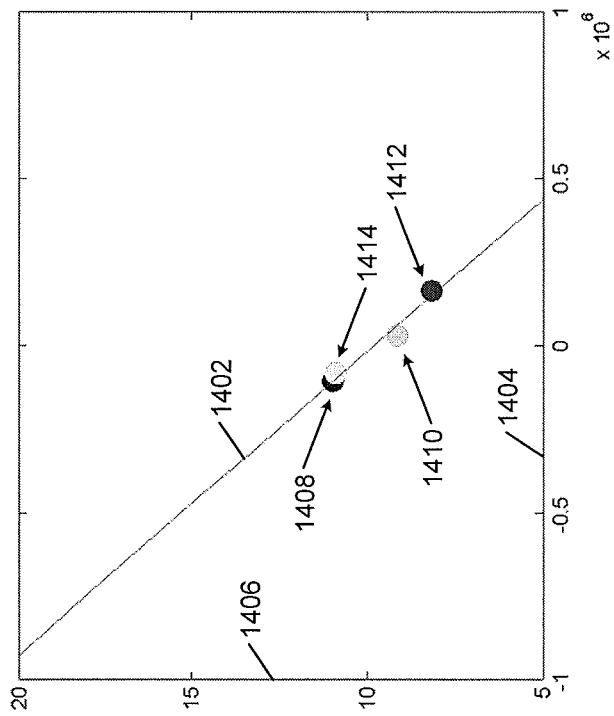
FIGS. 13 and 14 are graphs illustrating an example relationship between PC coefficients of cylinders and crank angles at which a predetermined percentage of fuel is burned in those cylinders according to the principles of the present disclosure.

FIG. 13 shows an example of the PC mode 1 coefficients of the cylinders and the CA50 values of the cylinders when the cylinders are not balanced. In contrast, FIG. 14 shows an example of the PC mode 1 coefficients of the cylinders and the CA50 values of the cylinders when the cylinders are balanced. All of the cylinders of the engine 102 may be balanced when the average value of the PC mode 1 coefficients of the cylinders is approximately zero and the variance of the PC mode 1 coefficient of each cylinder is representative of the cycle-to-cycle variation due to normal combustion.

FIG. 14 shows an example of a linear relationship 1402 between PC mode 1 coefficients of the four cylinders of the engine 102 and CA50 values for the four cylinders of the engine 102. The linear relationship 1402 is plotted with respect to an x-axis 1404 that represents the magnitude of the PC mode 1 coefficients and a y-axis 1406 that represents crank angle in degrees. FIG. 14 also shows data points 1408-1414 plotted with respect to the x-axis 404 and the y-axis 406. A first data point 1408 indicates the PC mode 1 coefficient of the first cylinder 118 and the CA50 of the first cylinder 118. A second data point 1410 indicates the PC mode 1 coefficient of the second cylinder 120 and the CA50 of the second cylinder 120. A third data point 1412 indicates the PC mode 1 coefficient of the third cylinder and the CA50 of the third cylinder. A fourth data point 1414 indicates the PC mode 1 coefficient of the fourth cylinder and the CA50 of the fourth cylinder.

FIG. 15 shows example estimated CA50 signals 1502-1508 and an example desired CA50 signal 1510 plotted with respect to an x-axis 1512 that represents engine cycle and a y-axis 1514 that represents crank angle in degrees. A first CA50 signal 1502 indicates the CA50 of the first cylinder 118. A second CA50 signal 1504 indicates the CA50 of the second cylinder 120. A third CA50 signal 1506 indicates the CA50 of the third cylinder of the engine 102. A fourth CA50 signal 1508 indicates the CA50 of the fourth cylinder of the engine 102.

FIG. 16 shows example PC mode 1 coefficient signals 1602-1608 plotted with respect to an x-axis 1610 that represents engine cycle and a y-axis 1612 that represents the magnitudes of the PC mode 1 coefficients indicated by the PC mode 1 coefficient signals 1602-1608. A first PC mode 1 coefficient signal 1602 indicates the PC mode 1 coefficient of the first cylinder 118. A second PC mode 1 coefficient signal 1604 indicates the PC mode 1 coefficient of the second cylinder 120. A third PC mode 1 coefficient signal 1606 indicates the PC mode 1 coefficient of the third cylinder of the engine 102. A fourth PC mode 1 coefficient signal 1608 indicates the PC mode 1 coefficient of the fourth cylinder of the engine 102.

FIG. 17 shows example spark timing signals 1702-1708 plotted with respect to an x-axis 1710 that represents engine cycle and a y-axis 1712 that represents crank angle in degrees. A first spark timing signal 1702 indicates the spark timing of the first cylinder 118. A second spark timing signal 1704 indicates the spark timing of the first cylinder 118. A third spark timing signal 1706 indicates the spark timing of the third cylinder of the engine 102. A fourth spark timing signal 1708 indicates the spark timing of the fourth cylinder of the engine 102.

Between 0 and 20 engine cycles, the spark control module 220 is not adjusting the spark timing of the cylinders of the engine 102 to balance the cylinders. Therefore, the spark timing signals 1702-1708 are equal to zero. However, at 20 engine cycles, the spark control module 220 starts to adjust the spark timing of the cylinders based on the PC mode 1 coefficients of the cylinders as described above in order to balance the cylinders. Thus, the CA50 signals 1502-1508 start to converge toward the desired CA50 signal 1510, as shown in FIG. 15, and the PC mode 1 coefficient signals 1602-1608 start to converge toward zero, as shown in FIG. 16. By 40 engine cycles, the cylinders are balanced.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a first crank angle module that determines a first crank angle of an engine at which a predetermined percentage of fuel in a first cylinder of the engine is combusted based on M pressures in the first cylinder;
a second crank angle module that determines whether a second crank angle of the engine is greater than or less than the first crank angle based on N pressures in the first cylinder and N pressures in a second cylinder of the engine, wherein:
the second crank angle is a crank angle at which the predetermined percentage of fuel in the second cylinder is combusted; and
M and N are integers greater than one; and
a spark control module that:
adjusts spark timing of the first cylinder based on the first crank angle; and
advances spark timing of the second cylinder when the second crank angle is greater than the first crank angle; and
retards the spark timing of the second cylinder when the second crank angle is less than the first crank angle.

2. The system of claim 1 wherein:
the second crank angle module samples a first pressure signal at N crank angles during an engine cycle to obtain the N pressures in the second cylinder, wherein the first pressure signal indicates pressure in the first cylinder; and
the second crank angle module samples a second pressure signal at N crank angles during the engine cycle to obtain the N pressures in the second cylinder, wherein the second pressure signal indicates pressure in the second cylinder.

3. The system of claim 2 wherein N is less than M.

4. The system of claim 2 further comprising a pressure difference module that, for each of the N crank angles:
determines an average value of one of the N pressures in the first cylinder and one of the N pressures in the second cylinder;
determines a first difference between the one of the N pressures in the first cylinder and the corresponding average value; and
determines a second difference between the one of the N pressures in the second cylinder and the corresponding average value, wherein the second crank angle module determines whether the second crank angle is greater than or less than the first crank angle further based on the first and second differences.

5. The system of claim 4 further comprising a principal component (PC) coefficient module that determines a first PC coefficient of the first cylinder and a second PC coefficient of the second cylinder based on the first and second differences using PC analysis, wherein the second crank angle module determines whether the second crank angle is greater than or less than the first crank angle further based on the first and second PC coefficients.

6. The system of claim 5 wherein the second crank angle module determines whether the second crank angle is greater than or less than the first crank angle further based on a predetermined relationship between (i) the first and second crank angles and (ii) the first and second PC coefficients.

7. The system of claim 6 wherein:
the second crank angle module determines a difference between the first and second crank angles further based on the predetermined relationship; and
the spark control module adjusts the spark timing of the second cylinder by an amount that is based on the difference between the first and second crank angles.

8. The system of claim 2 wherein the first crank angle module:
determines a total amount of heat released during combustion of fuel in the first cylinder during the engine cycle based on the M pressures in the first cylinder; and
determines the first crank angle based on the total amount of heat released.

9. A system comprising:
a first crank angle module that determines a first crank angle of an engine at which a predetermined percentage of fuel in a first cylinder of the engine is combusted based on M pressures in the first cylinder;
a principal component (PC) coefficient module that determines a first PC coefficient of the first cylinder and a second PC coefficient of a second cylinder of the engine based on N pressures in the first cylinder and N pressures in the second cylinder using PC analysis, wherein M and N are integers greater than one; and
a spark control module that:
adjusts spark timing of the first cylinder based on the first crank angle; and
adjusts spark timing of the second cylinder based on a relationship between the first and second PC coefficients.

10. The system of claim 9 further comprising a second crank angle module that:
samples a first pressure signal at N crank angles during an engine cycle to obtain the N pressures in the second cylinder, wherein the first pressure signal indicates pressure in the first cylinder; and
samples a second pressure signal at N crank angles during the engine cycle to obtain the N pressures in the second cylinder, wherein the second pressure signal indicates pressure in the second cylinder.

11. The system of claim 10 further comprising a pressure difference module that, for each of the N crank angles:
determines an average value of one of the N pressures in the first cylinder and one of the N pressures in the second cylinder;
determines a first difference between the one of the N pressures in the first cylinder and the corresponding average value; and
determines a second difference between the one of the N pressures in the second cylinder and the corresponding average value, wherein the PC coefficient module determines the first and second PC coefficients based on the first and second differences using PC analysis.

12. The system of claim 11 wherein:
the relationship between the first and second PC coefficients includes whether the second PC coefficient is greater than or less than the first PC coefficient;
the spark control module advances the spark timing of the second cylinder when the second PC coefficient is less than the first PC coefficient; and
the spark control module retards the spark timing of the second cylinder when the second PC coefficient is greater than the first PC coefficient.

13. The system of claim 12 wherein:
the relationship between the first and second PC coefficients includes a difference between the first and second PC coefficients; and
the spark control module adjusts the spark timing of the second cylinder by an amount that is based on the difference between the first and second PC coefficients.

14. A method comprising:
determining a first crank angle of an engine at which a predetermined percentage of fuel in a first cylinder of the engine is combusted based on M pressures in the first cylinder;
determining whether a second crank angle of the engine is greater than or less than the first crank angle based on N pressures in the first cylinder and N pressures in a second cylinder of the engine, wherein:
the second crank angle is a crank angle at which the predetermined percentage of fuel in the second cylinder is combusted; and
M and N are integers greater than one;
adjusting spark timing of the first cylinder based on the first crank angle; and
advancing spark timing of the second cylinder when the second crank angle is greater than the first crank angle; and
retarding the spark timing of the second cylinder when the second crank angle is less than the first crank angle.

15. The method of claim 14 wherein:
sampling a first pressure signal at N crank angles during an engine cycle to obtain the N pressures in the second cylinder, wherein the first pressure signal indicates pressure in the first cylinder; and
sampling a second pressure signal at N crank angles during the engine cycle to obtain the N pressures in the second cylinder, wherein the second pressure signal indicates pressure in the second cylinder.

16. The method of claim 15 wherein N is less than M.

17. The method of claim 15 further comprising, for each of the N crank angles:
determining an average value of one of the N pressures in the first cylinder and one of the N pressures in the second cylinder;
determining a first difference between the one of the N pressures in the first cylinder and the corresponding average value;
determining a second difference between the one of the N pressures in the second cylinder and the corresponding average value; and
determining whether the second crank angle is greater than or less than the first crank angle further based on the first and second differences.

18. The method of claim 17 further comprising:
determining a first PC coefficient of the first cylinder and a second PC coefficient of the second cylinder based on the first and second differences using PC analysis; and
determining whether the second crank angle is greater than or less than the first crank angle further based on the first and second PC coefficients.

19. The method of claim 18 further comprising determining whether the second crank angle is greater than or less than the first crank angle further based on a predetermined relationship between (i) the first and second crank angles and (ii) the first and second PC coefficients.

20. The method of claim 19 further comprising:
determining a difference between the first and second crank angles further based on the predetermined relationship; and adjusting the spark timing of the second cylinder by an amount that is based on the difference between the first and second crank angles.

21. The method of claim 15 further comprising:
determining a total amount of heat released during combustion of fuel in the first cylinder during the engine cycle based on the M pressures in the first cylinder; and
determining the first crank angle based on the total amount of heat released.

22. A method comprising:
determining a first crank angle of an engine at which a predetermined percentage of fuel in a first cylinder of the engine is combusted based on M pressures in the first cylinder;
determining a first PC coefficient of the first cylinder and a second PC coefficient of a second cylinder of the engine based on N pressures in the first cylinder and N pressures in the second cylinder using PC analysis, wherein M and N are integers greater than one;
adjusting spark timing of the first cylinder based on the first crank angle; and
adjusting spark timing of the second cylinder based on a relationship between the first and second PC coefficients.

23. The method of claim 22 further comprising:
sampling a first pressure signal at N crank angles during an engine cycle to obtain the N pressures in the second cylinder, wherein the first pressure signal indicates pressure in the first cylinder; and
sampling a second pressure signal at N crank angles during the engine cycle to obtain the N pressures in the second cylinder, wherein the second pressure signal indicates pressure in the second cylinder.

24. The method of claim 23 further comprising, for each of the N crank angles:
determining an average value of one of the N pressures in the first cylinder and one of the N pressures in the second cylinder;
determining a first difference between the one of the N pressures in the first cylinder and the corresponding average value;
determining a second difference between the one of the N pressures in the second cylinder and the corresponding average value; and
determining the first and second PC coefficients based on the first and second differences using PC analysis.

25. The method of claim 24 wherein the relationship between the first and second PC coefficients includes whether the second PC coefficient is greater than or less than the first PC coefficient, the method further comprising:
advancing the spark timing of the second cylinder when the second PC coefficient is less than the first PC coefficient; and
retarding the spark timing of the second cylinder when the second PC coefficient is greater than the first PC coefficient.

26. The method of claim 25 wherein the relationship between the first and second PC coefficients includes a difference between the first and second PC coefficients, the method further comprising adjusting the spark timing of the second cylinder by an amount that is based on the difference between the first and second PC coefficients.

* * * * *